US005937144A

United States Patent [19]

Wilkins et al.

[11] Patent Number: 5,937,144

[45] Date of Patent: Aug. 10, 1999

[54] RASTERIZED PROXY OF A VECTOR IMAGE

[75] Inventors: David Wilkins, Seattle; Phil Sherman, Bellevue; Robert Scheld, Seattle, all of Wash.

[73] Assignee: Adobe Systems Incorporated, San Jose, Calif.

[21] Appl. No.: 08/851,988

[22] Filed: May 6, 1997

Related U.S. Application Data

[60] Provisional application No. 60/016,983, May 6, 1996, and provisional application No. 60/017,029, May 7, 1996.

[51] Int. Cl.[6] .................. G06K 15/00

[52] U.S. Cl. .................. 395/102; 395/112

[58] Field of Search .................. 395/101, 102, 395/112, 114, 115, 113, 835, 836, 837; 382/299, 298

[56] References Cited

U.S. PATENT DOCUMENTS

| | | | |
|---|---|---|---|
| 4,982,344 | 1/1991 | Jordan et al. | 364/521 |
| 5,153,936 | 10/1992 | Morris et al. | 395/128 |
| 5,159,669 | 10/1992 | Trigg et al. | 395/159 |
| 5,204,947 | 4/1993 | Berstein et al. | 395/157 |
| 5,353,388 | 10/1994 | Motoyama | 395/117 |
| 5,500,929 | 3/1996 | Dickinson | 395/160 |
| 5,615,325 | 3/1997 | Peden | 395/326 |

OTHER PUBLICATIONS

Hawn, Matthew, "Cyberfinder: track internet URLs via the finder", *Macworld*, vol. 13, No. 3, p. 82, Mar. 1996.

*Primary Examiner*—Arthur G. Evans
*Attorney, Agent, or Firm*—Fish & Richardson P.C.

[57] ABSTRACT

An integrated graphics manipulation program that employs a technique of rasterizing EPS files during import and using this rasterized version as a "proxy image" for display of an on-screen image. When a document containing a EPS data is printed to a PS printer, the actual EPS data is sent to the printer. If the document is printed to a non-PS printer, the rasterized proxy representation of the EPS data is used. The effect that this has is that the on-screen representation of the EPS data (the rasterized proxy image) is a high quality representation of the EPS data. The original EPS data may be re-rasterized at a new scale to generate a new proxy image whenever a user resizes the proxy image on the display. This results in an on-screen representation that more closely resembles the printed output to a PS printer. The EPS data also may be re-rasterized at a new scale to generate a new proxy image whenever a user zooms in to or out of a document. This would give the desired effect of reducing aliasing that occurs when a static rasterized image is zoomed. With this approach, the EPS proxy image becomes a dynamic on-screen representation of the original EPS data. The preferred "native" file format for any program implementing the invention remains vector-based, so that the highest quality image is always available regardless of printer type.

8 Claims, 1 Drawing Sheet

RASTERIZED PROXY OF A VECTOR IMAGE

This application is a continuation of provisional applications Ser. Nos. 60/016,983, filed May 6, 1996 and 60/017,029, filed May 7, 1996.

BACKGROUND OF THE INVENTION

1. Field of the Invention

This invention relates to computer software, particularly for use in manipulating and printing graphic images.

2. Description of Related Art

Conventional graphics programs manipulate either bitmaps or vector-based drawings. Vector-based drawings have the advantage of being more readily scalable without significant loss of detail. Scaling bitmapped graphics can result in visible defects, such as aliasing (sometimes known as "jaggies" for the stair-step edges that appear along diagonal lines of enlarged bitmapped images). Bitmapped images also tend to have large file sizes, and are difficult to edit to change text, line placement, etc. Vector-based drawings are thus commonly preferred for images that need to be revised. However, printing or displaying a vector-based drawing generally requires that a bitmap rendering be performed at some time, since most printers and display monitors are raster-scanned bitmap devices.

One common vector-based system, Encapsulated PostScript (EPS), stores vector information as data and commands, requiring a special parsing program to interpret such information and render a rasterized output for print or display purposes. Such parsing and rendering is often time consuming. Special PostScript compatible (PS) printers are generally required to print EPS files.

Conventional bitmap graphics programs can often import EPS files, but store any resulting output as bitmap files and can only print as bitmaps on PS printers and non-PS printers. Vector-based programs that can directly manipulate EPS files must print to PS printers to obtain the highest quality output.

The present invention is directed to an improved method of manipulating EPS files such that a single, integrated program can print to both PS printers and non-PS printers at the highest output quality available.

SUMMARY OF THE INVENTION

The invention is an integrated graphics manipulation program that employs a technique of rasterizing EPS files during import and using this rasterized version as a "proxy image" for display of an on-screen image. When a document containing EPS data is printed to a PS printer, the actual EPS data is sent to the printer. If the document is printed to a non-PS printer, the rasterized proxy representation of the EPS data is used. The effect that this has is that the on-screen representation of the EPS data (the rasterized proxy image) is a high quality representation of the EPS data.

As an option, the original EPS data may be re-rasterized at a new scale to generate a new proxy image whenever a user resizes the proxy image on the display. This results in an on-screen representation that more closely resembles the printed output to a PS printer. As a further option, the EPS data may be re-rasterized at a new scale to generate a new proxy image whenever a user zooms in to or out of a document. This would give the desired effect of reducing aliasing ("jaggies") that occurs when a static rasterized image is zoomed, particular when zooming in. With this approach, the EPS proxy image becomes a dynamic on-screen representation of the original EPS data.

Another aspect of the present invention is that the preferred "native" file format for any program implementing the invention remains vector-based, so that the highest quality image is always available regardless of printer type.

The details of the preferred embodiment of the present invention are set forth in the accompanying drawings and the description below. Once the details of the invention are known, numerous additional innovations and changes will become obvious to one skilled in the art.

BRIEF DESCRIPTION OF THE DRAWINGS

Like reference numbers and designations in the various drawings indicate like elements.

DETAILED DESCRIPTION OF THE INVENTION

Figure 1:
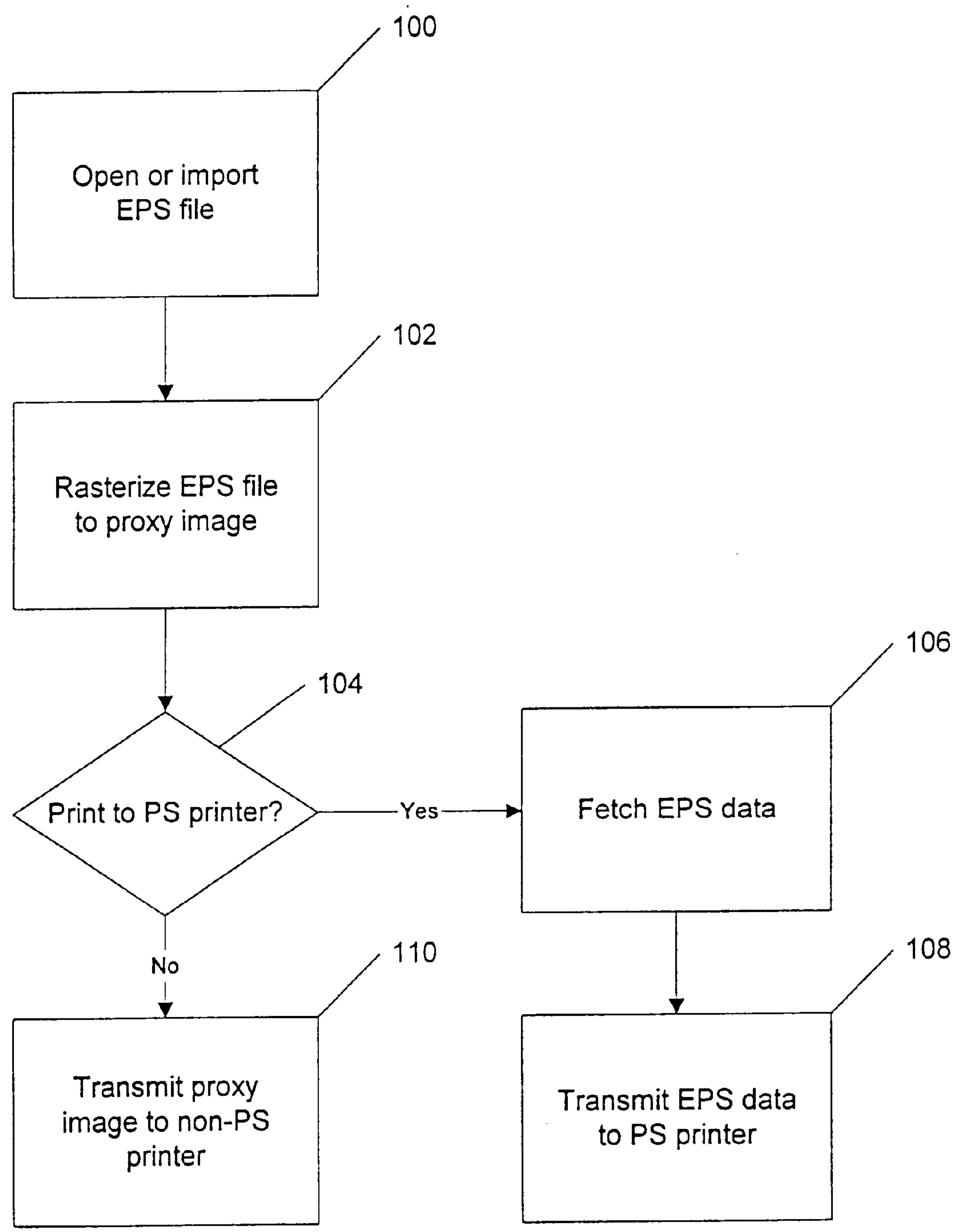
FIG. 1 is a flowchart showing a preferred method of generating and using a rasterized proxy of a vector image.

Throughout this description, the preferred embodiment and examples shown should be considered as exemplars, rather than as limitations on the present invention.

FIG. 1 is a flowchart showing a preferred method of generating and using a rasterized proxy of a vector image. A conventional Encapsulated PostScript (EPS) data file is imported into a program that embodies the present invention, or simply "opened" (STEP 100). A parsing and rendering routine generates a raster or bitmapped version of the graphics image embodied in the EPS data, in known fashion (STEP 102). This rasterized version is a "proxy image" used for display of an image on a conventional raster-scanned monitor.

Thereafter, if a user prints the displayed image, the operating system is queried by the program in known fashion as to whether the indicated printer is a PostScript (PS) printer (STEP 104). If so, the actual EPS data is sent to the printer (for example, by re-reading the EPS data from disk) (STEP 106), and sends that data to the printer for parsing and rendering by the printer (STEP 108). This ensures that the higher quality EPS data is used to generate the final print output on the PS printer.

It will be recognized that the PS printer may not be an actual printing device, but instead a program, such as Adobe Acrobat™ from Adobe Systems Incorporated, that parses and renders a EPS data into a "portable document format" (PDF).

If the printer is determined to be a non-PS printer (STEP 104), then the program sends the proxy image to the printer to be printed as a bitmap (STEP 110). This ensures that the file can be printed despite the fact that the original EPS data was not directly compatible with the non-PS printer.

The overall effect that the invention has is that the on-screen representation of the EPS data (the rasterized proxy image) is a high quality representation of the EPS data.

As an option, the original EPS data may be re-rasterized at a new scale to generate a new proxy image whenever a user resizes the proxy image on the display. For example, if the user changes the window size of the proxy image by a factor of two, then the original EPS data may be re-rasterized at that scale to generate a better quality proxy image for display. This results in an on-screen representation that more closely resembles the printed output to a PS printer.

As a further option, the EPS data may be re-rasterized at a new scale to generate a new proxy image whenever a user zooms in to or out of a document (for example, if the window size is kept the same, but the contents of the proxy image are zoomed in). This would give the desired effect of reducing aliasing ("jaggies") that occurs when a static rasterized image is zoomed, particular when zooming in.

With this approach, the EPS proxy image becomes a dynamic on-screen representation of the original EPS data.

As yet another option, when printing to a non-PS printer, the EPS data can be rasterized to optimize the bitmap sent to the printer to best conform to the printer's print resolution. For example, if a printer outputs at 300 dpi, an EPS image can be rasterized at 300 dpi for printing, but at 72 dpi for display on a typical monitor.

Another aspect of the present invention is that the preferred "native" file format for any program implementing the invention remains vector-based, so that the highest quality image is always available regardless of printer type. Thus, in the preferred embodiment, the native file format for a program implementing the invention would store an imported EPS data file as conventional EPS data. However, the invention can be used with external EPS files by using a linking reference, rather than by storing the EPS data in a native file format.

The invention may be implemented in hardware or software, or a combination of both. However, preferably, the invention is implemented in computer programs executing on programmable computers each comprising a processor, a data storage system (including volatile and non-volatile memory and/or storage elements), at least one input device, and at least one output device. Program code is applied to input data to perform the functions described above and generate output information. The output information is applied to one or more output devices, in known fashion.

Each program is preferably implemented in a high level procedural or object oriented programming language to communicate with a computer system. However, the programs can be implemented in assembly or machine language, if desired. In any case, the language may be a compiled or interpreted language.

Each such computer program is preferably stored on a storage media or device (e.g., ROM or magnetic diskette) readable by a general or special purpose programmable computer, for configuring and operating the computer when the storage media or device is read by the computer to perform the procedures described herein. The inventive system may also be considered to be implemented as a computer-readable storage medium, configured with a computer program, where the storage medium so configured causes a computer to operate in a specific and predefined manner to perform the functions described herein.

A number of embodiments of the present invention have been described. Nevertheless, it will be understood that various modifications may be made without departing from the spirit and scope of the invention. Accordingly, it is to be understood that the invention is not to be limited by the specific illustrated embodiment, but only by the scope of the appended claims.

What is claimed is:

1. A method of using an image stored in a vector-based data file, comprising the steps of:

(a) rendering the stored image from the vector-based data file as a bitmapped proxy image for display at a first scale;

(b) displaying the bitmapped proxy image at the first scale on a visual output device;

(c) before printing to an output device or program, determining whether the output device or program is capable of rendering a vector-based data file, and (1) if so, then printing the original image from the vector-based data file; and (2) if not, then printing the bitmapped proxy image.

2. The method of claim 1, further comprising the steps of:

(a) resizing a display window of the visual output device;

(b) re-rendering the stored image from the vector-based data file as a bitmapped proxy image for display at a second scale; and (c) displaying the bitmapped proxy image at the second scale in the resized display window of the visual output device.

3. The method of claim 1, further comprising the steps of:

(a) selecting a zoom factor for display of the stored image;

(b) re-rendering the stored image from the vector-based data file as a bitmapped proxy image for display at a second scale corresponding to the selected zoom factor; and (c) displaying the bitmapped proxy image at the second scale on the visual output device.

4. The method of claim 1, further comprising the steps of:

(a) before printing to an output device or program that is not capable of rendering a vector-based data file, re-rendering the stored image from the vector-based data file as a bitmapped print image at a selected resolution corresponding to at least the minimum resolution of the output device or program;

(b) printing thc bitmapped print image at the selected resolution.

5. A computer program, residing on a computer-readable medium, for using an image stored in a vector-based data file, comprising instructions for causing a computer to:

(a) render the stored image from the vector-based data file as a bitmapped proxy image for display at a first scale;

(b) display the bitmapped proxy image at the first scale on a visual output device;

(c) before printing to an output device or program, determine whether the output device or program is capable of rendering a vector-based data file, and (1) if so, then print the original image from the vector-based data file; and (2) if not, then print the bitmapped proxy image.

6. The program of claim 5, further comprising instructions for causing a computer to:

(a) resize a display window of the visual output device;

(b) re-render the stored image from the vector-based data file as a bitmapped proxy image for display at a second scale; and (c) display the bitmapped proxy image at the second scale in the resized display window of the visual output device.

7. The program of claim 5, further comprising instructions for causing a computer to:

(a) select a zoom factor for display of the stored image;

(b) re-render the stored image from the vector-based data file as a bitmapped proxy image for display at a second scale corresponding to the selected zoom factor; and (c) display the bitmapped proxy image at the second scale on the visual output device.

8. The program of claim 5, further comprising instructions for causing a computer to:

(a) before printing to an output device or program that is not capable of rendering a vector-based data file, re-render the stored image from the vector-based data file as a bitmapped print image at a selected resolution corresponding to at least the minimum resolution of the output device or program;

(b) print the bitmapped print image at the selected resolution.

* * * * *